(12) United States Patent
Weng et al.

(10) Patent No.: US 8,972,260 B2
(45) Date of Patent: Mar. 3, 2015

(54) SPEECH RECOGNITION USING MULTIPLE LANGUAGE MODELS

(75) Inventors: Fuliang Weng, Mountain View, CA (US); Zhe Feng, Mountain View, CA (US); Kui Xu, Sunnyvale, CA (US); Lin Zhao, Sunnyvale, CA (US)

(73) Assignee: Robert Bosch GmbH, Stuttgart, DE (US)

( * ) Notice: Subject to any disclaimer, the term of this patent is extended or adjusted under 35 U.S.C. 154(b) by 371 days.

(21) Appl. No.: 13/450,861

(22) Filed: Apr. 19, 2012

(65) Prior Publication Data

US 2012/0271631 A1  Oct. 25, 2012

Related U.S. Application Data

(60) Provisional application No. 61/477,533, filed on Apr. 20, 2011.

(51) Int. Cl.
*G10L 15/00* (2013.01)
*G10L 15/32* (2013.01)
(Continued)

(52) U.S. Cl.
CPC ............... *G10L 15/32* (2013.01); *G10L 15/063* (2013.01); *G10L 15/18* (2013.01); *G10L 15/193* (2013.01); *G10L 15/197* (2013.01); *G10L 15/30* (2013.01)
USPC ............... 704/243; 704/9; 704/8; 704/269; 704/260; 704/257; 704/256; 704/255; 704/254; 704/253; 704/251; 704/246; 704/244; 704/240; 704/236; 704/235; 704/233; 704/231; 715/257; 715/255; 379/88.01

(58) Field of Classification Search
USPC ......... 704/243, 9, 8, 269, 260, 257, 256, 255, 704/254, 253, 251, 246, 244, 240, 236, 235, 704/233, 231, 205; 379/88.01; 715/257, 715/255
See application file for complete search history.

(56) References Cited

U.S. PATENT DOCUMENTS 5,710,866 A * 1/1998 Alleva et al. ............... 704/256.4
5,893,059 A * 4/1999 Raman ....................... 704/256.2
(Continued)

FOREIGN PATENT DOCUMENTS

EP  2034472 A1  3/2009

OTHER PUBLICATIONS

International Search Report and Written Opinion in corresponding PCT Application (i.e., PCT/US2012/034261), completed Jun. 25, 2012 (9 pages).
(Continued)

*Primary Examiner* — Michael Colucci
(74) *Attorney, Agent, or Firm* — Maginot Moore & Beck LLP

(57) ABSTRACT

In accordance with one embodiment, a method of generating language models for speech recognition includes identifying a plurality of utterances in training data corresponding to speech, generating a frequency count of each utterance in the plurality of utterances, generating a high-frequency plurality of utterances from the plurality of utterances having a frequency that exceeds a predetermined frequency threshold, generating a low-frequency plurality of utterances from the plurality of utterances having a frequency that is below the predetermined frequency threshold, generating a grammar-based language model using the high-frequency plurality of utterances as training data, and generating a statistical language model using the low-frequency plurality of utterances as training data.

20 Claims, 7 Drawing Sheets

(51) Int. Cl.
*G10L 15/06* (2013.01)
*G10L 15/18* (2013.01)
*G10L 15/193* (2013.01)
*G10L 15/197* (2013.01)
*G10L 15/30* (2013.01)

(56) References Cited

U.S. PATENT DOCUMENTS

| | | | |
|---|---|---|---|
| 5,899,973 A * | 5/1999 | Bandara et al. | 704/256.2 |
| 5,937,384 A * | 8/1999 | Huang et al. | 704/256 |
| 6,292,767 B1 | 9/2001 | Jackson et al. | |
| 6,314,399 B1 * | 11/2001 | Deligne et al. | 704/257 |
| 6,334,102 B1 * | 12/2001 | Lewis et al. | 704/255 |
| 6,629,073 B1 * | 9/2003 | Hon et al. | 704/256.4 |
| 6,823,307 B1 * | 11/2004 | Steinbiss et al. | 704/252 |
| 6,904,402 B1 * | 6/2005 | Wang et al. | 704/10 |
| 7,103,542 B2 * | 9/2006 | Doyle | 704/231 |
| 7,124,080 B2 * | 10/2006 | Chen et al. | 704/244 |
| 7,299,180 B2 * | 11/2007 | Wang et al. | 704/257 |
| 8,392,190 B2 * | 3/2013 | Chen et al. | 704/256.1 |
| 8,606,796 B2 * | 12/2013 | Martin et al. | 707/750 |
| 2004/0148154 A1 | 7/2004 | Acero et al. | |
| 2005/0010390 A1 * | 1/2005 | Shimohata | 704/5 |
| 2005/0108001 A1 * | 5/2005 | Aarskog | 704/10 |
| 2007/0027671 A1 * | 2/2007 | Kanawa | 704/4 |
| 2009/0083214 A1 * | 3/2009 | Konig et al. | 707/2 |
| 2010/0250240 A1 | 9/2010 | Shu | |
| 2011/0234524 A1 * | 9/2011 | Longe et al. | 345/173 |

OTHER PUBLICATIONS

SoftScan website, "VoCon® 3200 ASR Development Tools"; ftp://ftp.scansoft.com/pub/embedded/ds_VoCon3200_ASRDev.pdf, published as early as Apr. 14, 2012, USA, 4 pages.

* cited by examiner

SPEECH RECOGNITION USING MULTIPLE LANGUAGE MODELS

This application claims the benefit of priority of U.S. provisional application Ser. No. 61/477,533, filed Apr. 20, 2011, the disclosure which is herein incorporated by reference in its entirety.

TECHNICAL FIELD

This application relates generally to the field of automated speech recognition, and more particularly to intelligent speech recognitions systems and methods that employ multiple language models.

SUMMARY

In accordance with one embodiment, a method of generating language models for speech recognition includes identifying a plurality of utterances in training data corresponding to speech, generating a frequency count of each utterance in the plurality of utterances, generating a high-frequency plurality of utterances from the plurality of utterances having a frequency that exceeds a predetermined but adjustable frequency threshold, generating a low-frequency plurality of utterances from the plurality of utterances having a frequency that is below the predetermined frequency threshold, generating a grammar-based language model using the high-frequency plurality of utterances as training data, and generating a statistical language model using the low-frequency plurality of utterances as training data.

In accordance with a further embodiment, a method of performing speech recognition includes collecting a plurality of utterances, generating a frequency count of each utterance in the plurality of utterances, identifying a high-frequency segment of the plurality of utterances based upon a predetermined frequency threshold, identifying a low-frequency segment of the plurality of utterances based upon the predetermined frequency threshold, generating a final grammar-based language model based on at least a portion of the high-frequency segment, generating a final statistical language model based on at least a portion of the low-frequency segment, performing a first speech recognition using the final grammar-based language model, performing a second speech recognition using the final statistical language model; and determining a recognized speech based upon the first speech recognition and the second speech recognition. The method further includes the refinement of the threshold to improve the performance of the speech recognizer with multiple models.

In yet another embodiment, an intelligent speech recognition system includes at least one audio input, at least one memory, a family of grammar-based language models stored within the at least one memory, a family of statistical language models stored within the at least one memory, and at least one processor operably connected to the at least one audio input and the at least one memory and configured to (i) perform a first speech recognition using the family of grammar-based language models, (ii) perform a second speech recognition using the family of statistical language models, and (iii) determine a recognized speech based upon the first speech recognition and the second speech recognition, wherein the family of grammar-based language models is generated based upon a generated frequency count of each utterance in a plurality of utterances identified as being in a high-frequency segment of the plurality of utterances based upon a predetermined frequency threshold, and the family of statistical language models is generated based upon a generated frequency count of each utterance in a plurality of utterances identified as being in a low-frequency segment of the plurality of utterances based upon the predetermined frequency threshold.

DETAILED DESCRIPTION

Figure 1:
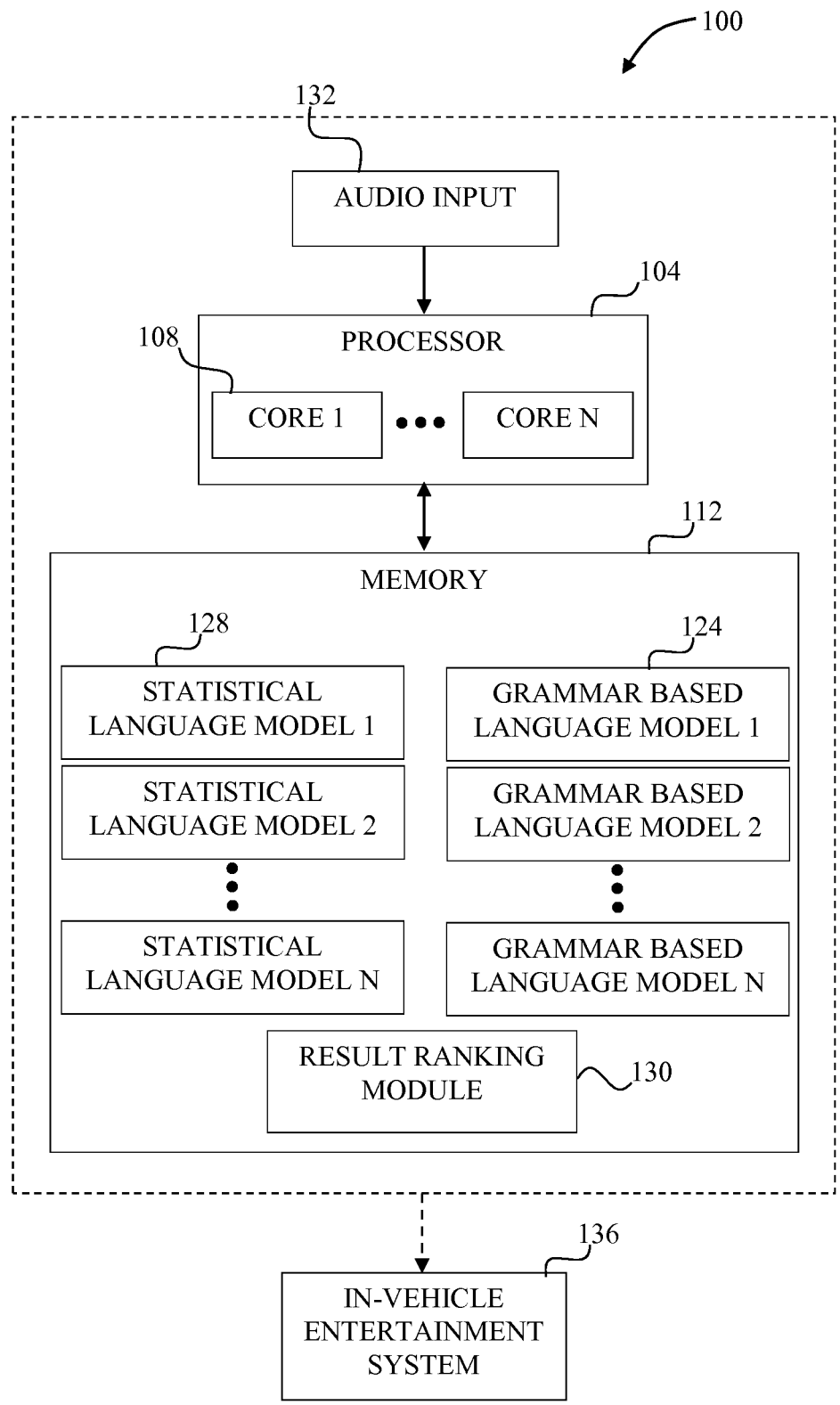
FIG. 1 is a schematic view of an intelligent speech recognition system that is configured to use a family of grammar-based language models and a family of statistical language models to perform speech recognition on spoken utterances.

For a general understanding of the details for the systems and processes disclosed herein, the drawings are referenced throughout this document. In the drawings, like reference numerals designate like elements. As used herein, the term "utterance" refers to any speech spoken by a human including words and phrases. The term "utterance data" refers to data corresponding to one or more utterances. The utterance data may correspond to a direct sound recording of the utterance, or may be processed data generated from a speech recognizer, which typically includes a front-end processor, such as a digital signal processor, acoustic modeler, and a language model.

FIG. 1 depicts a schematic diagram of a speech recognition system 100. System 100 includes a processor 104, memory 112, and audio input 132. The processor 104 is an electronic processing device such as a microcontroller, application specific integrated circuit (ASIC), field programmable gate array (FPGA), microprocessor including microprocessors from the x86 and ARM families, or any electronic device configured to perform the functions disclosed herein.

In the embodiment of FIG. 1, processor 104 includes N cores 108. Each core 108 in the processor 104 is configured to execute programmed instructions, and the cores 108 are configured to execute programmed instructions concurrently. In some embodiments, each of the cores 108 have a substantially identical configuration, while in other embodiments some of the cores are configured for different uses. For example, in one embodiment one set of the cores 108 are general processing cores such as processing cores in the x86 or ARM family of instruction sets, while another set of the cores 108 are configured to perform digital signal processing (DSP) operations that are commonly used in processing of audio data for speech recognition. Some or all of the functions provided by the memory 112 and audio input 132 may be integrated with the processor 104 using either hardware or software in a system on a chip (SoC) configuration.

Memory 112 is a data storage device configured to store data and provide the stored data to the processor 104, and to write data in response to a write command from the controller 104. Various embodiments of the memory 112 include random access memory (RAM), solid-state devices, magnetic hard drives, optical drives, and the like. The memory 112 is configured to hold one or more stored programs that provide programmed instructions that are executed by the processor 104. The programs include a family of grammar-based language models 124 and a family of statistical language models 128 for analysis of utterances, and a result ranking model 130, all of which are described more fully below.

Audio input 132 is a device that receives data corresponding to speech. In one embodiment, the audio input 132 is an acoustic transducer that records speech and provides signals corresponding to the recorded speech to the processor 104. For example, the acoustic transducer can be a microphone, a speaker, a dual microphone and speaker system, or other known transducer that converts audio signals to electrical signals and vice versa. The processor 104 may be integrated with the audio input 132 as a single device instead of separate devices. In other embodiments, the audio input 132 records speech and also performs signal processing and acoustic modeling of the speech data before providing the modeled data to the controller 104. In still another embodiment, the audio input 132 is a software program that extracts audio information, including speech, from one or more data sources such as digitally encoded audio and audio-visual sources. In each of the embodiments, audio input 132 provides data corresponding to speech to the processor 104 in a format that enables the processor 104 to perform speech recognition on the data.

The speech recognition system 100 may be operably coupled to a variety of devices 136 including computing, electronic, and mechanical devices 136 to enable voice operation of the systems. In one embodiment, the speech recognition system 100 is implemented solely on the electronic device 136 to facilitate user interaction with the device. In another embodiment, the speech recognition system 100 is distributed across multiple computing devices. In one such embodiment, the family of models 124/128 having the smallest footprint is stored within the memory 112 while the family of models 124/128 having the largest footprint is stored in a remote memory.

The device 136 is, in various embodiments, an in-vehicle entertainment system, an end-user computer system, a mobile computing device (such as personal digital assistance, mobile phone, smartphone, tablet, laptop, or the like), a consumer electronic device, a gaming device, a music player, a security system, a network server or server system, a telemedicine system, or any combination or portion thereof. The device 136 may be adapted to communicate with other devices, such as clients and/or servers, over a wired or wireless communications network.

In general, the system 100 receives spoken user natural language requests corresponding to various operations implemented in the device 136 which in the embodiment of FIG. 1 is an entertainment system 136. For example, the audio input 132 may be configured to receive a spoken request such as "PLAY NEXT SONG" and the processor 104 generates a command signal for the entertainment system 136 to advance playback to the next song in a song playlist. In some embodiments, the spoken user requests may be in the form of predetermined commands.

Figure 2:
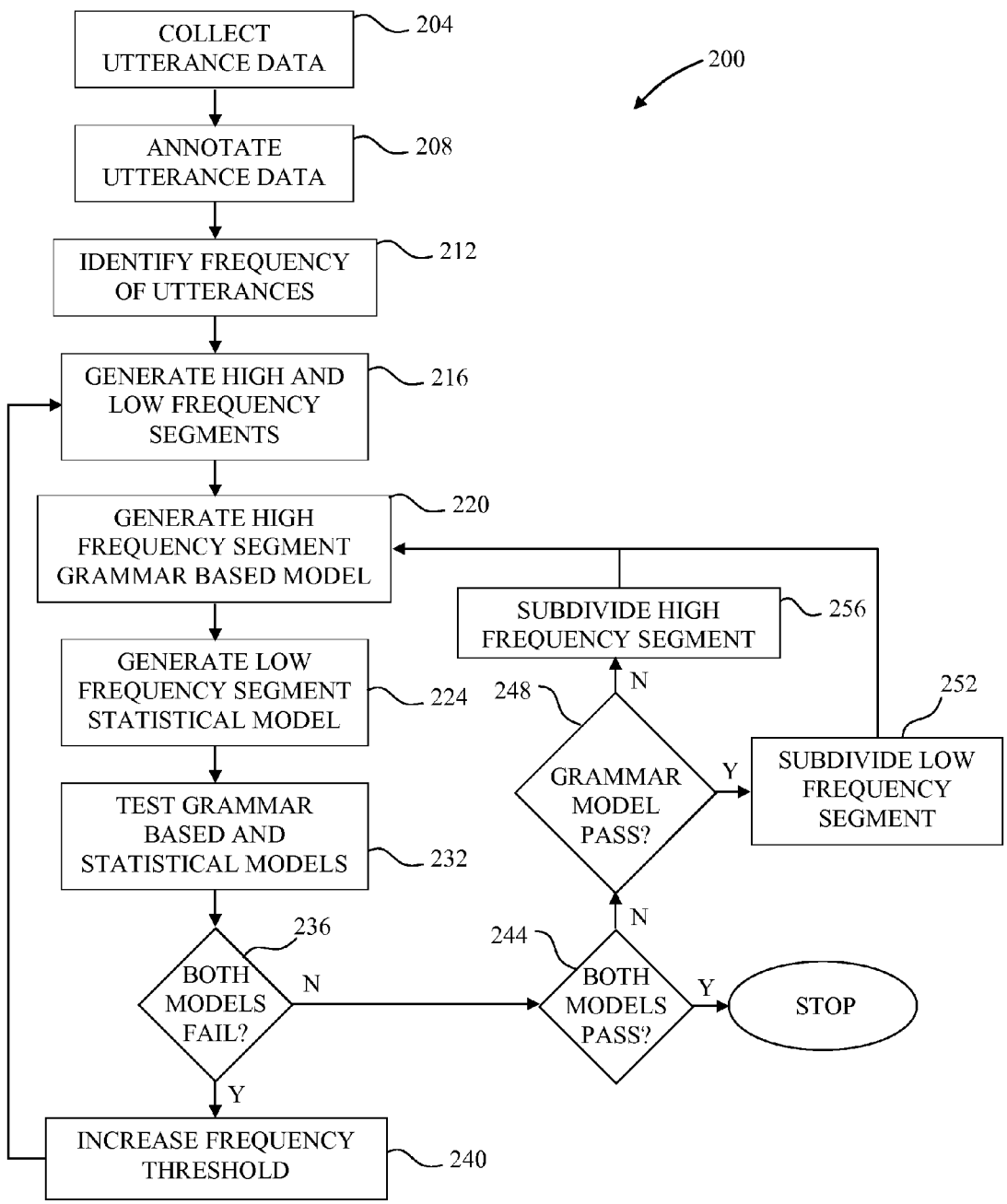
FIG. 2 is a block diagram of a process for generating the family of grammar-based language models and the family of statistical language models using selected segments of a training data set.

The family of grammar-based models 124 and the family of statistical models 128 of FIG. 1 are generated in one embodiment by a process 200 depicted in FIG. 2. The process 200 can be used to generate multiple language models from training data. Process 200 is described with reference to the speech language model training system 300 of FIG. 3, but the process 200 is also suitable for use with alternative speech recognition system embodiments. Moreover, while the training system 300 of FIG. 3 uses the same processor 104, audio input 132, and memory 112 of FIG. 1, different components are used to generate the family of grammar-based models 124 and the family of statistical models 128 with the family of grammar-based models 124 and the family of statistical models 128 then saved into the system 100 in other embodiments.

Figure 3:
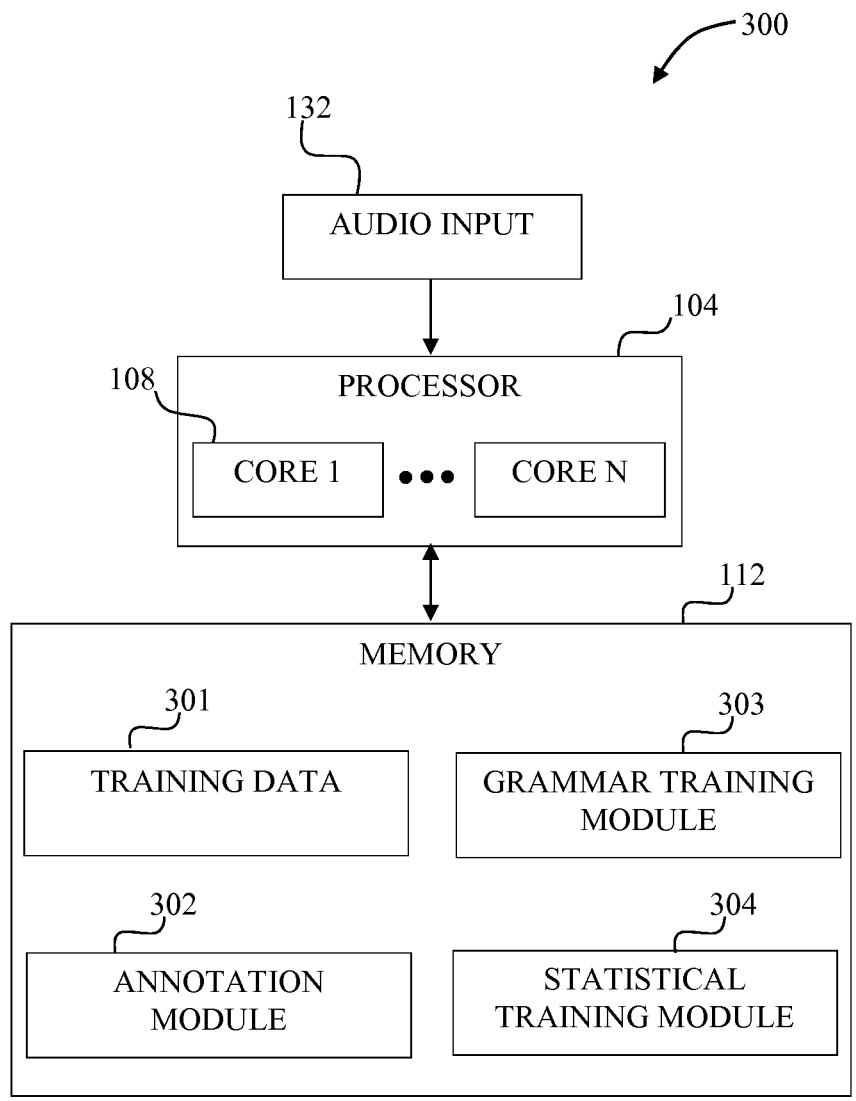
FIG. 3 is a schematic diagram of a training system, which in this embodiment uses components in common with the speech recognition system of FIG. 1, which can be used to execute the process of FIG. 2.

The memory 112 in FIG. 3 includes training data 301, an annotation module 302 for classification of utterances in speech data, a grammar-based training module 303 for generation of one or more grammar-based language model(s) for speech recognition, and a statistical training module 304 for generation of one or more statistical language model(s) for speech recognition.

The training data 301 correspond to a plurality of utterances that are used for generating language models to perform speech recognition. The training data 301 include speech data corresponding to a plurality of utterances. Each utterance is a spoken word, phrase having multiple words, or a sentence with multiple words. In a typical embodiment, the training data 301 include multiple variations of a single utterance, such as speech data for a single phrase as spoken by various people. The contents of the training data 301 are configurable to include utterances that are typical of speech patterns that the system 100 recognizes during operation.

Process 200 includes generation of both grammar-based language models and statistical language models such as n-gram models and class-based n-gram models. Grammar-based language models include finite state grammars and context free grammars, among others. These models are typically optimized for accurate and efficient recognition of a comparatively small set of terms that are frequently used in speech. An example of a finite state grammar is represented as one or more graphs with a plurality of nodes representing words or word classes connected to each other by edges. Various rules in the grammar-based model govern the distribution of edges between words and word classes that are recognized in the grammar. The rules can be generated from observations of transitions between words in frequently used utterances in training data. Some of the grammar rules may be derived recursively, for example, through word classes.

Statistical language models include n-gram models that are generated from a large corpus of text. In one configuration, n-gram models use the state of one or more known words to provide a conditional probability for what the next word will be. The "n" in n-gram represents a number of given words that are evaluated to determine the probability of the next word. Thus, in a 2-gram or bigram model trained over an English corpus, one word has empirically measured probabilities of preceding another word. This concept is discussed with reference to FIG. 4 which is a highly simplified graphical representation of a statistical language model 310.

Figure 4:
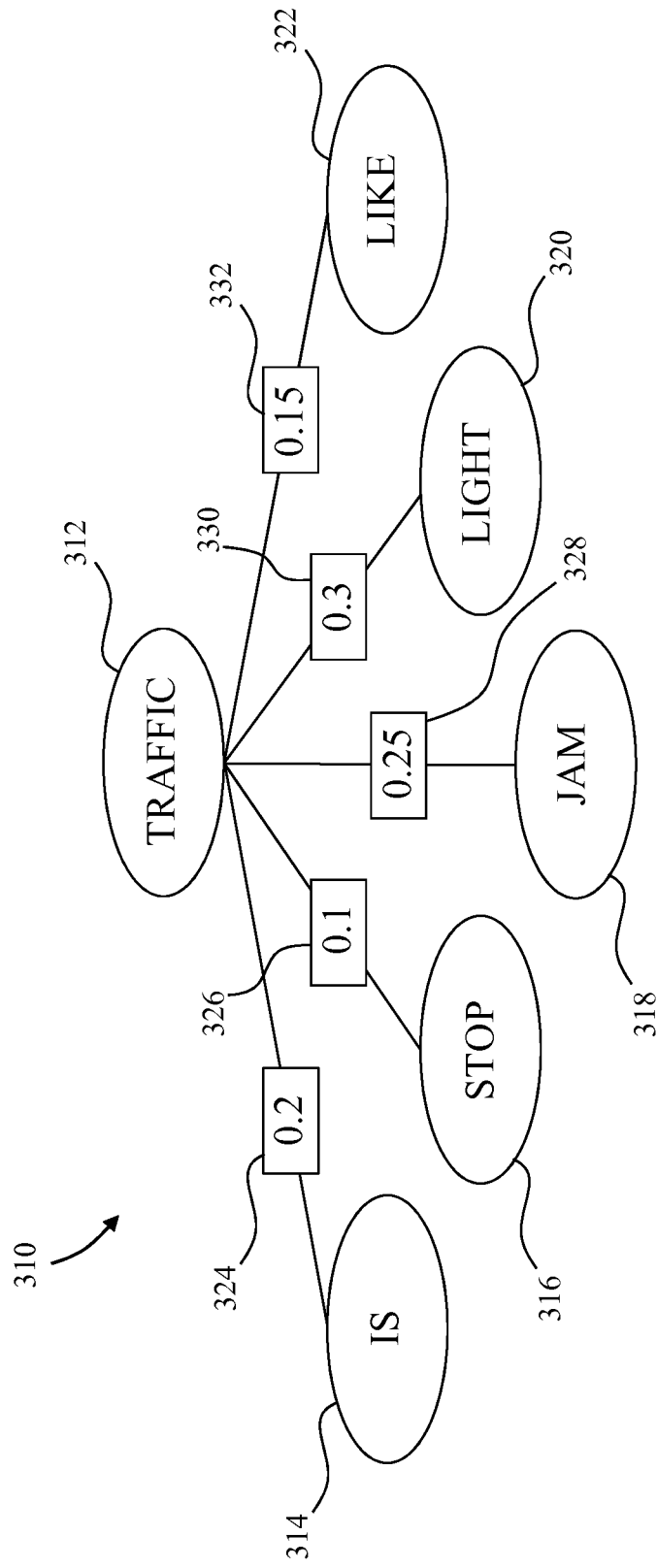
FIG. 4 is a simplified graphical representation of an example statistical model identifying probabilities for a word to be spoken based upon a single previously spoken word.

In FIG. 4, an initial word 312 has been previously identified, which in this example is the word "traffic". Based upon a large corpus of text, a set of possible words for a word which follows the word "traffic" is identified. This set of word is represented in this simplified example by the "following words" 314, 316, 318, 320, and 322. For each of the following words 314, 316, 318, 320, and 322, a respective probability 324, 326, 328, 330, and 332 is assigned based upon the empirical data from the corpus of text. The probabilities 324, 326, 328, 330, and 332, which will add up to a value of "1", indicate the likelihood that the associated following word 314, 316, 318, 320, or 322, will be spoken. Thus, when the previously identified word is "TRAFFIC", in the example of FIG. 4, the most likely word to occur next is "LIGHT".

While in the above simplified example a single word was used to generate the probabilities for a following word, other n-gram models use two or more known words to generate a conditional probability for the next word in a phrase.

The grammar-based language models and statistical models such as the n-gram models are each effective in performing speech recognition. The two types of models, however, perform differently for different speech patterns. Grammar-based models typically perform the best when analyzing a narrow scope of speech and the grammatical alternatives have roughly the same probability, or are uniformly distributed. Statistical models perform best when analyzing more complex phrases with a stable but non-flat distribution so that different alternatives can be easily distinguished.

Process 200 begins by collecting utterance data (block 204). In one embodiment, the utterance data is collected directly by prompting a user to speak predetermined words and phrases. In another embodiment, the utterance data includes a data corresponding to words, phrases, and sentences recorded from multiple sources. In one embodiment, the user simply responds naturally to prompts using the user's own natural expressions or utterances. The collected utterance data is stored as the training data 301 in the memory 112.

Process 200 continues by annotating the utterance data with class labels (block 208). Annotations include classes that are assigned to one or more utterance entries. The classes include, for example, user natural language requests, commands and named entities that the speech recognition system recognizes Examples of user natural language requests or commands in an automotive speech recognition system include playing a song, pausing playback, setting a location in a navigation system, dialing a phone number, texting a message, playing a voice message, activating/deactivating a security system, and requesting a weather report. Annotations may also be applied to class names of entities such as titles of songs, albums, place of interests, and radio channels. In system 300, the processor 104 may annotate the utterance data dynamically using the annotation module 302 prior to generating the language models.

As described above, each of the grammar-based language models and statistical language models are better suited to deal with a respective type of utterances. Accordingly, process 200 segments the training utterance data to enable each language model to be generated with a subset of the training utterance data that includes utterances that are best suited to each of the language models. To this end, process 200 identifies the frequency of each utterance in the training utterance data (block 212). The number of utterances that correspond to each class annotation can be used to generate a histogram of the frequency of each type of utterance in the training data.

Process 200 divides the training utterance data into two segments based on the identified frequency of utterances in the training utterance data (block 216). Training utterance data which occurs with a frequency that is greater than a predetermined threshold frequency is apportioned to a "high-frequency segment". Training utterance data which occurs with a frequency that is less than a predetermined threshold frequency is apportioned to a "low-frequency segment". The threshold frequency may be a frequency threshold selected based on various factors including the total number of utterances present in the training utterance data and the distribution of frequencies of the utterances. In one embodiment, the threshold frequency is selected to be the median of the distribution of frequencies in the training utterance data.

Process 200 generates a first grammar-based language model using the high-frequency utterance data segment (block 220) and generates a first statistical language model using the low-frequency utterance data segment (block 224). Some embodiments perform the generation of the grammar-based language model and the statistical language model concurrently. In system 300, processor 104 may generate the grammar-based language model using the grammar training module 303 on one processor, while the processor 104 executes the statistical training module 304 on a different processor to generate the statistical language model. Since the grammar-based language model is generated using the high-frequency utterance data segment and the statistical model is generated using the low-frequency utterance data segment, the language models are generated independently without requiring dependencies between the utterance data applied to each model.

The resulting statistical language model "A" trained with low-frequency data may be interpolated with another background statistical language model "B" trained with a set of data which may also contain the high frequency data. In this case, the interpolation weight for the model "A" typically is much higher than the interpolation weight for the model "B". This interpolation can be used for all the statistical models described in this invention.

Process 200 tests the initially generated language models and generates additional language models as needed during a tuning process which begins at block 232. Process 200 first performs speech recognition tests using both the grammar-based language model and the statistical language models (block 232) on a set of test utterances. In one embodiment, both language models perform speech recognition over a plurality of test utterances. Another embodiment performs tests using two sets of previously determined utterance data, one set of utterances being selected to test the grammar-based language model and the other set of utterances being selected to test the statistical language model.

Once a respective speech recognition result has been generated by each of the language models for the test utterances, the performance of each language model is measured using one or more factors including the accuracy of recognition and the amount of time that was required by each model to produce a speech recognition result. The performance of each language model is compared to a predetermined performance threshold. Each language model may have a different performance threshold or target. In one embodiment, the grammar-based language model has a performance threshold of a 95% accuracy with an average recognition time of one second, while the statistical language model has a perform threshold of 80% accuracy with an average recognition time of two seconds.

If neither of the language models meets or exceeds the performance threshold (block 236), the initial language models are rejected and the process 200 increases the frequency threshold used to divide the utterance data into the high-frequency segment and the low-frequency segment (block 240). Process 200 subsequently segments the utterance data using the increased frequency threshold, generates grammar-based and statistical language models with the revised utterance data segments, and performs speech recognition tests with the revised language models as described above in process blocks 216-232 until at least one model reaches the performance target (block 236). Once a language model reaches the performance target, in any of the scenarios described herein, the language model is saved in the appropriate family of language models 124 or 128 in the memory 112.

If both the grammar-based and statistical language models exceed the performance threshold (block 244), the tuning process ends and both of the language models are saved and the process 200 continues with a ranking phase that is described in more detail below.

In the alternative, one of either the grammar-based language model or the statistical language model exceeds the performance threshold, while the other language model falls below the performance threshold (block 244). If only the grammar-based language model exceeds the performance threshold (block 248), the original grammar-based language model is saved. Then, the low-frequency utterance data segment used to generate the statistical language model is subdivided into a high-frequency sub-segment and a low-frequency sub-segment using a second frequency threshold that is lower than the first frequency threshold (block 252).

The just tested statistical language model is then discarded and process 200 generates new grammar-based and statistical language models. A new grammar-based language model (high frequency model) is generated using the original high-frequency segment and the high-frequency sub-segment (block 220). In an alternative embodiment, a new grammar-based model is generated using only the high frequency sub-segment. Additionally, a new statistical language model (low-frequency model) is generated using only the low-frequency sub-segment (block 224).

The process 200 then continues at block 232, and performs speech recognition tests with the new language models (block 232). The newly generated grammar-based language model based on the high-frequency sub-segment in the low-frequency segment can have different grammar rules than the earlier generated grammar-based language model based on the original high-frequency utterance data segment. If both of the language models meets or exceeds the performance threshold, the models are saved and the process stops. If only one of the language models meets or exceeds the performance criteria, then that model is saved and process 200 continues at either block 252 or 256.

In cases wherein only the statistical language model exceeds the predetermined performance threshold (block 248), the statistical language model is saved in some embodiments, and the high-frequency utterance data segment used to generate the grammar-based language model is subdivided into a high-frequency sub-segment and a low-frequency sub-segment using a third frequency threshold that is higher than the original threshold (block 256).

The just tested grammar-based language model is then discarded and process 200 generates new grammar-based and statistical language models. A new grammar-based language model (high frequency model) is generated using only the high-frequency sub-segment (block 220). Additionally, a new statistical language model (low-frequency model) is generated using the low-frequency sub-segment (block 224). In alternative embodiments, a statistical language model may be generated using both the low-frequency sub-segment and the original low frequency segment. The process 200 then continues at block 232, and performs speech recognition tests with the new language models (block 232). The newly generated statistical language model based on the low-frequency sub-segment can have different grammar rules than the earlier generated statistical language model based solely on the original low-frequency utterance data segment.

Process 200 continues the tuning phase by subdividing the utterance data into high-frequency and low-frequency sub-segments using different frequency thresholds until each of the generated language models (from blocks 220 and 224) exceeds the predetermined performance threshold at block 244 or until a desired number of grammar-based and/or statistical language models have been generated. The pattern of frequency thresholds may be predetermined or may be based upon the performance scores of the two models.

Figure 5:
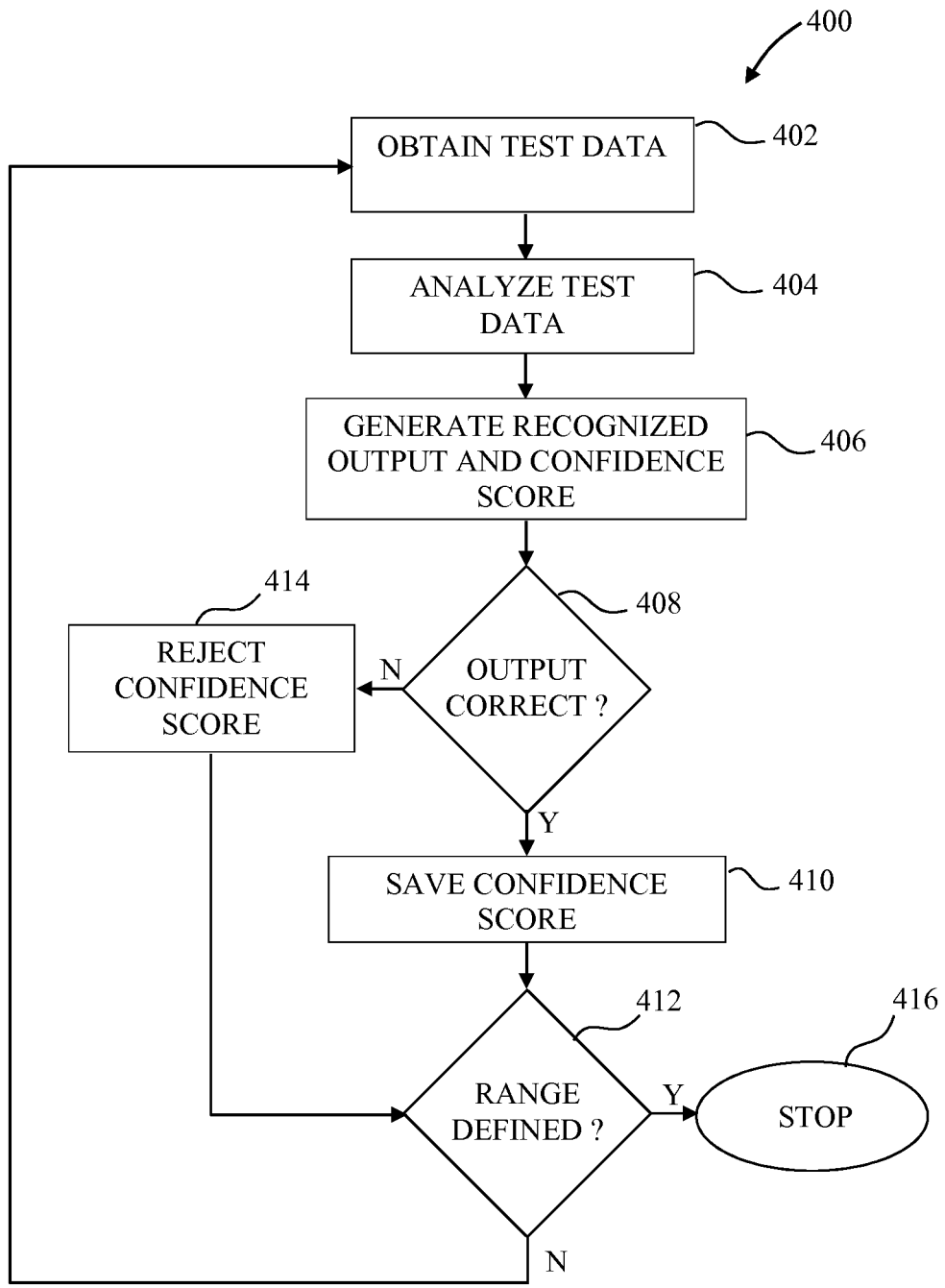
FIG. 5 is a block diagram of a process that is used to generate, for each of the models within the family of grammar-based language models and the family of statistical language models, a range of confidence scores, generated by a recognizer associated with a respective one of the language models, each point in the range of confidence scores associated with a correctly recognized test utterance.

Once all of the generated language models exceed the relevant performance threshold (block 244), process 200 continues with a ranking phase. A ranking phase is depicted in FIG. 5 as process 400. The ranking phase, which can be executed using the system of FIG. 1 or 3, can be executed concurrently with the process of FIG. 2. The ranking process 400 begins at block 402 with obtaining test utterance data. Each of the models in the family of grammar-based language models and the family of statistical language models then analyze the test utterance data at block 404.

Each of the models in the family of grammar-based language models 124 and the family of statistical language models 128 is associated with a recognizer which at block 406 generates a recognized output and a confidence score for each of the respective models in the family of grammar-based language models and the family of statistical language models. At block 408, the recognized output of each of the models in the family of grammar-based language models and the family of statistical language models is compared to the actual test utterance transcribed manually (aka, the reference sentence of the same speech utterance).

If at block 408 the recognized output of a particular model is correct, i.e. it matches the test utterance data, then the process 400 continues at block 410 and the confidence score generated by the associated recognizer for the analysis of the test utterance data is used to define range of confidence scores associated with correctly recognizing test data utterances.

If at block 408 the recognized output of a particular model is not correct, i.e. it does not match the test utterance data, then the process 400 continues at block 414 and the confidence score generated by the associated recognizer for the analysis of the test utterance data is rejected.

Process 400 then continues at block 412 and the ranges of confidence scores associated with correctly recognizing test data utterances for each of the models in the family of grammar-based language models and the family of statistical language models is assessed to determine whether or not a desired range of confidence scores associated with correctly recognizing test data utterances has been generated. This assessment may be based upon, for example, a threshold number of correctly recognized test utterances. If a respective range has been adequately defined at block 412, the process terminates at block 416.

If additional confidence scores are needed in order to establish, for each of the models, a respective desired range of confidence scores associated with correctly recognized test data utterances, then the process continues at block 402. If desired, all of the models may be used to assess additional test utterance data. Alternatively, only a subset of models may be used to assess additional test utterance data.

Once a respective desired range of confidence scores associated with correctly recognized test data utterances has been generated for each of the models in the family of grammar-based language models and the family of statistical language models, the ranges are stored in the result ranking module 130 of FIG. 1. The system 100 may then be used in an operational mode to recognize unknown utterance data.

Figure 6:
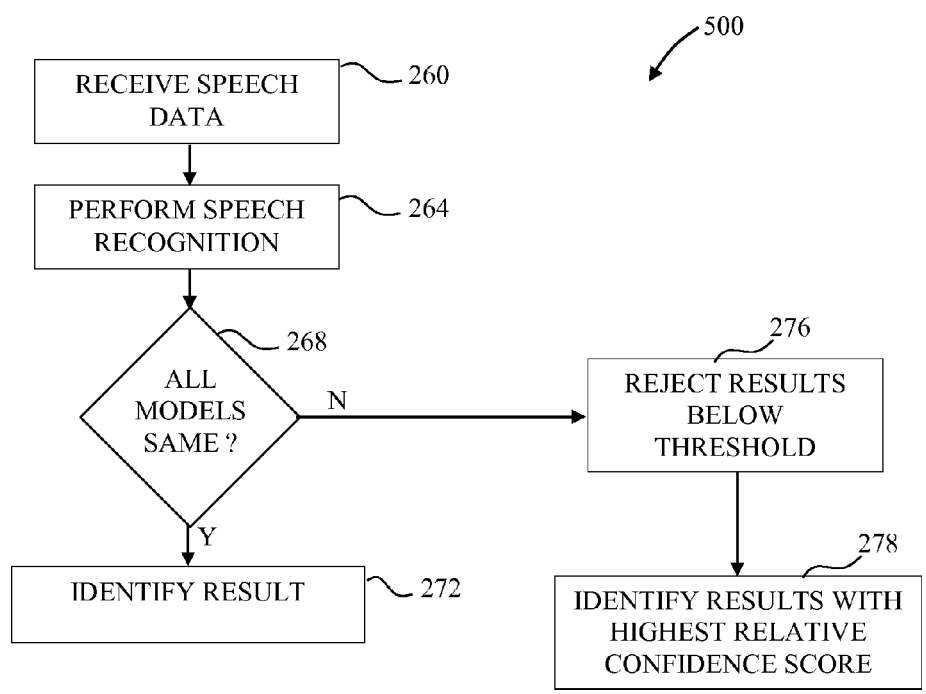
FIG. 6 is a block diagram of a process for using the family of grammar-based language models and the family of statistical language models to recognize unknown utterances.

One process for recognizing new speech utterance is depicted in FIG. 6. The recognition process 500 of FIG. 6 begins when the system 100 receives the speech utterance for recognition (block 260). In system 100, the audio input 132 receives the speech utterance using, for example, a microphone to receive a spoken user natural language request or a command. Once the speech data are received, process 500 performs speech recognition on the speech data using each of the generated grammar-based and statistical language models (block 264). As described above, all the generated language model are used in the speech recognition process. In system 100, processor 104 performs speech recognition using some or all of the generated language models concurrently on the processing cores 108.

For each of the various grammar-based and statistical language models, the speech recognizer with that model produces a result for the input speech data. If the results generated by all of the language models are same (block 268), then the final speech recognition result is simply the same recognition result (block 272).

In situations where the results from different language models produce two or more different results, process 200 selects a result using the result ranking module 130 (block 276). Specifically, as noted above, each of the language models has an associate recognizer which produces a recognized output. The recognizers also generate a confidence score associated with the recognized output. The processor 104 executes instructions from the result ranking module 130 to analyze the generated confidence score for each of the models against the range of confidence scores associated with correctly recognized test data utterances (the "acceptable range of confidence scores") in block 278.

If the generated confidence score of a result from a particular language model is lower than the lowest confidence score in the acceptable range of confidence scores, then the recognized output of that model is discarded. If all of the confidence scores for all of the language models are lower than the lowest confidence score in the respective acceptable range of confidence scores, then the system flags the result as unrecognized.

If only one confidence score of all of the language models is higher than the lowest confidence score in the respective acceptable range of confidence scores, then the recognized output associated with that confidence score is identified as the recognized output for the system 100.

If more than one confidence score of all of the language models is higher than the lowest confidence score in the respective acceptable range of confidence scores, then the system 100 ranks the confidence scores of the results from the remaining models. In one embodiment, the confidence scores of the remaining models are ranked as a percentage of the highest confidence score in the acceptable range of confidence scores for the respective model. Thus, if model $M_1$ has a confidence score of 75 and an acceptable range of confidence scores of 60-75, then model $M_1$ would have a 100% relative confidence score or ranking, derived from $(75-60)/(75-60)=100\%$. If model $M_2$ has a confidence score of 90 and an acceptable range of confidence scores of 75-100, then model $M_2$ would have a relative confidence score or ranking, derived from $(90-75)/(100-75)=15/25=60\%$. Accordingly, the output of model $M_1$ would be selected as the recognized output for the system 100 because $M_1$ has a higher relative confidence score Ranking percentages of greater than 100% are possible. In another embodiment, the relative confidence score can be calculated by a weighted formula, where the weights are proportional to the counts of the confidence scores or the counts of the confidence score bins in the confidence score range.

In the embodiment, of FIG. 1, the family of grammar-based language models 124 and the family of statistical language models 128 are stored within the same memory 112 and executed by the same processor 104. In another embodiment, one or more models in a family of language models 124/128 may be stored within a device while the models in the other family of models 124/128 is stored remotely in a cloud computing system and accessed over a network. In some of these embodiments, two separate systems which may be identical to the system 100, but including only a single family of models 124/128, are used to generate recognized outputs from the models along with the associated confidence scores.

Figure 7:
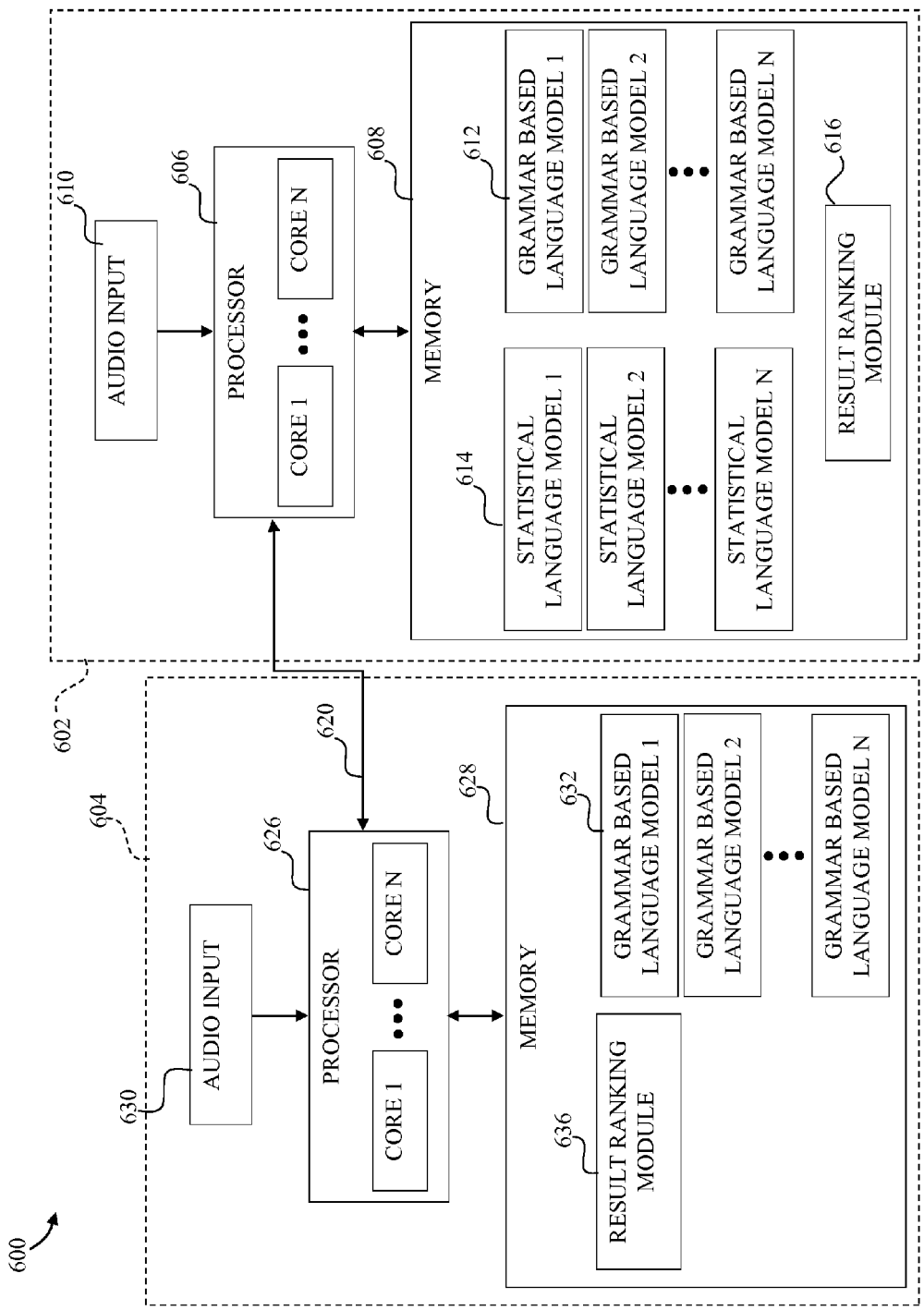
FIG. 7 is a schematic view of an intelligent speech recognition system that is configured to use a family of grammar-based language models and a family of statistical language models to perform speech recognition on spoken utterances wherein a small footprint family of models is located within a client device and both a large footprint family of models and a small footprint family of models is stored within a cloud computing system connected to the client device by a network.

FIG. 7, by way of example, depicts a cloud computing system 600. System 600 includes a remote system 602 and a client device 604. The remote system 602 includes a processor 606, memory 608, and audio input 610. The memory 608 is configured to hold one or more stored programs that provide programmed instructions that are executed by the processor 606. The programs include a family of grammar-based language models 612 and a family of statistical language models 614, and a result ranking module 616. The remote system 602 is thus substantially identical to the system 100. The system 600 in some embodiments, however, has substantially greater computing power and resources (e.g., memory) than the corresponding components in system 100. In some embodiments, the remote system 602 does not include one or more of the audio input 610, grammar-based language models 612, and result ranking module 616.

The client device 604 is operably connected to the remote system 602 by a network 620. The client device 604 includes a processor 626, memory 628, and audio input 630. The memory 628 is configured to hold one or more stored programs that provide programmed instructions that are executed by the processor 626. The programs include a family of grammar-based language models 632, and a result ranking module 636.

The client device 604, which in this embodiment is an in-vehicle entertainment system, is thus substantially identical to the system 100. The system 604, however, has substantially less computing power and resources (e.g., memory) than the corresponding components in the remote system 602.

The system 600 operates in much the same manner as the system 100. Some differences, however, include the manner in which speech recognition is divided. Specifically, in the system 600, the client device 604 receives an audio input through the audio input 630. A digital form of the input is then sent to the processor 606 which performs speech recognition using the family of statistical language models 614. Concurrently, the processor 626 performs speech recognition using the family of grammar based language models 628. Because of the greater computing power of the remote system 602, both speech recognition analyses are completed in less time than would be necessary for the processor 626 to complete both speech recognition analyses.

The remote system 602 then passes the results and confidence scores from the analysis using the statistical language models 614 to the processor 626 and the processor 626 performs a result ranking analysis as described above.

Accordingly, a small footprint family of models, typically grammar-based language models 632, may be used by the speech recognition engine in a thin client device such as, an in-vehicle entertainment system, an end-user computer system, a mobile computing device (such as personal digital assistance, mobile phone, smartphone, tablet, laptop, or the like), a consumer electronic device, a gaming device, a music player, a security system, a network server or server system, a telemedicine system, or any combination or portion thereof. At the same time, the other language models, such as the large statistical language model 128, may be used by a speech recognition engine in one or more powerful servers, for example, in a cloud computing system accessed over a network. The output results from both speech recognition engines can be combined based on confidence scores as described above.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method of generating language models for speech recognition comprising:
   identifying a plurality of utterances in training data corresponding to speech;
   generating a frequency count of each utterance in the plurality of utterances;
   generating a high-frequency plurality of utterances from the plurality of utterances having a frequency that exceeds a predetermined frequency threshold;
   generating a low-frequency plurality of utterances from the plurality of utterances having a frequency that is below the predetermined frequency threshold;
   generating with at least one processor a grammar-based language model using the high-frequency plurality of utterances as training data;
   storing the grammar based language model in a memory;
   generating with the at least one processor a statistical language model using the low-frequency plurality of utterances as training data; and
   storing the statistical language model in the memory.

2. The method of claim 1, further comprising:
   performing a plurality of speech recognition experiments with the grammar-based language model;
   identifying a performance of the grammar-based language model in the speech recognition experiments;
   generating a second low-frequency plurality of utterances and second high-frequency plurality of utterances from the high-frequency plurality of utterances when the performance of the grammar-based language model is below a predetermined performance threshold;
   generating a second grammar-based language model using the second high-frequency plurality of utterances as training data by executing with the at least one processor program instructions stored in the memory; and
   generating a second statistical language model using the second low-frequency plurality of utterances as training data by executing with the at least one processor the program instructions stored in the memory.

3. The method of claim 1, further comprising:
   performing a plurality of speech recognition experiments with the statistical language model;
   identifying a performance of the statistical language model in the speech recognition experiments;
   generating a second low-frequency plurality of utterances and second high-frequency plurality of utterances from the low-frequency plurality of utterances when the performance of the statistical language model is below a predetermined performance threshold;
   generating a second grammar-based language model using the second high-frequency plurality of utterances as training data by executing with the at least one processor program instructions stored in the memory; and
   generating a second statistical language model using the second low-frequency plurality of utterances as training data by executing with the at least one processor the program instructions stored in the memory.

4. The method of claim 1, further comprising:
   performing a plurality of speech recognition experiments with the grammar-based language model;
   identifying a performance of the grammar-based language model in the speech recognition experiments by executing with the at least one processor program instructions stored in the memory;
   performing the plurality of speech recognition experiments with the statistical language model;
   identifying a performance of the statistical language model in the speech recognition experiments by executing with the at least one processor the program instructions stored in the memory; and
   increasing the predetermined frequency threshold when the performance of the grammar-based language model is below a predetermined performance threshold and the performance of the statistical language model is below another predetermined performance threshold.

5. The method of claim 1, wherein:
   the at least one processor comprises a first processor core and a second processor core; and
   the first processor core performs at least a portion of the generation of the grammar-based language model concurrently with the second processor core performing at least a portion of generation of the statistical language model.

6. The method of claim 1 further comprising:
   performing, by executing with the at least one processor program instructions stored in the memory, a speech recognition operation on speech data using the stored grammar-based language model to generate a first speech recognition result;
   performing, by executing with the at least one processor the program instructions stored in the memory, a speech recognition operation on the speech data using the stored statistical language model to generate a second speech recognition result; and
   identifying, by executing with the at least one processor the program instructions stored in the memory, a final speech recognition result as either of the first speech recognition result or the second speech recognition result when the first speech recognition result is equivalent to the second speech recognition result.

7. The method of claim 6, the identification of the final speech recognition result further comprising:
   identifying a first relative confidence score of the first speech recognition result;
   identifying a second relative confidence score of the second speech recognition result;
   identifying the first speech recognition result as the final speech recognition result when the first relative confidence score is greater than the second relative confidence score; and identifying the second speech recognition result as the final speech recognition result when the second relative confidence is greater than the first relative confidence score.

8. The method of claim 6, wherein:
the at least one processor comprises a first processor core and a second processor core; and
the first processor core performs at least a portion of the speech recognition operation using the grammar-based language model concurrently with the second processor core performing at least a portion of the speech recognition operation using the statistical language model.

9. A method of performing speech recognition comprising:
collecting a plurality of utterances;
generating a frequency count of each utterance in the plurality of utterances;
identifying a high-frequency segment of the plurality of utterances based upon a predetermined frequency threshold;
identifying a low-frequency segment of the plurality of utterances based upon the predetermined frequency threshold;
generating a family of grammar-based language models based on at least a portion of the high-frequency segment;
generating a family of statistical language models based on at least a portion of the low-frequency segment;
performing a first speech recognition using the family of grammar-based language models;
performing a second speech recognition using the family of statistical language models; and
determining a recognized speech based upon the first speech recognition and the second speech recognition.

10. The method of claim 9, wherein at least one of the family of grammar-based language models and the family of statistical language models includes more than one language model.

11. An intelligent speech recognition system comprising:
at least one audio input;
at least one memory;
a family of grammar-based language models stored within the at least one memory;
a family of statistical language models stored within the at least one memory; and
at least one processor operably connected to the at least one audio input and the at least one memory and configured to (i) perform a first speech recognition using the family of grammar-based language models, (ii) perform a second speech recognition using the family of statistical language models, and (iii) determine a recognized speech based upon the first speech recognition and the second speech recognition, wherein
the family of grammar-based language models is generated based upon a generated frequency count of each utterance in a plurality of utterances identified as being in a high-frequency segment of the plurality of utterances based upon a predetermined frequency threshold; and
the family of statistical language models is generated based upon a generated frequency count of each utterance in a plurality of utterances identified as being in a low-frequency segment of the plurality of utterances based upon the predetermined frequency threshold.

12. The system of claim 11, wherein:
the family of statistical language models includes a plurality of statistical language models; and
the family of grammar-based language models includes a plurality of grammar-based language models.

13. The system of claim 11, wherein at least a portion of the intelligent speech recognition system is located within or remotely from one or more client devices.

14. The system of claim 13, wherein the client device is selected from a group consisting of an in-vehicle entertainment system, an end-user computer system, a mobile computing device, an electronic device, a gaming device, a music player, a security system, a network server or server system, and a telemedicine system.

15. The system of claim 11, wherein the at least one audio input comprises a microphone.

16. The system of claim 11, further comprising:
a plurality of recognizers, each of the plurality of recognizers associated with a respective one of the models in the family of grammar-based language models and the family of statistical language models, and configured to generate a recognized output and a confidence score associated with the recognized output based upon a model output from the respective model in the family of grammar-based language models or the family of statistical language models, the model output based upon utterance data provided to the respective model.

17. The system of claim 16, wherein the at least one processor is configured to:
determine if the recognized output for a first utterance data is correct;
save the confidence score associated with each recognized output for the first utterance data that is correct; and
define a respective range of confidence scores for each of the family of grammar-based language models and the family of statistical language models based upon the saved confidence scores.

18. The system of claim 17, wherein the at least one processor is further configured to:
obtain a second confidence score associated with each recognized output for a second utterance data;
compare the obtained second confidence score associated with each recognized output to the respective range of confidence scores; and
determine the recognized speech based upon the comparison of the obtained second confidence scores.

19. The system of claim 11, wherein:
the family of grammar-based language models is stored within one of a client device and a cloud computing system operably connected to the client device through a network; and
the family of statistical language models is stored within the other of the client device and the cloud computing system.

20. The system of claim 19, wherein the family of grammar-based language models is stored within the client device.

* * * * *